Aug. 31, 1926.                                          1,598,065
                        J. DUNLOP
                SAFETY DEVICE FOR ELEVATORS
                 Filed August 16, 1924
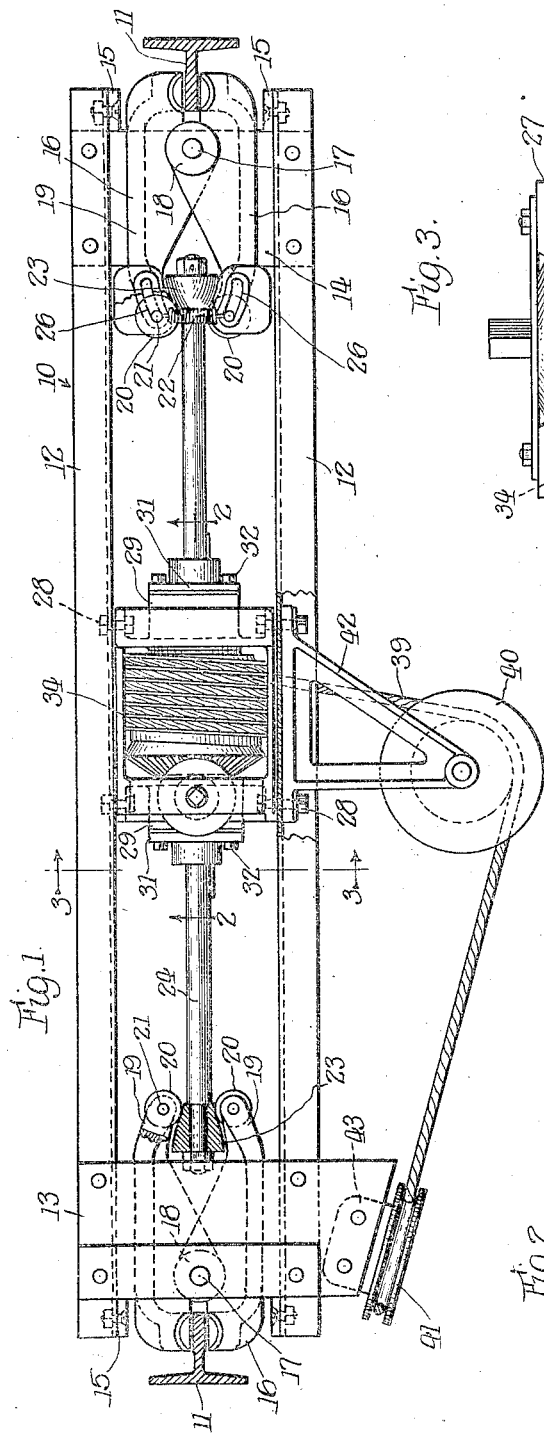
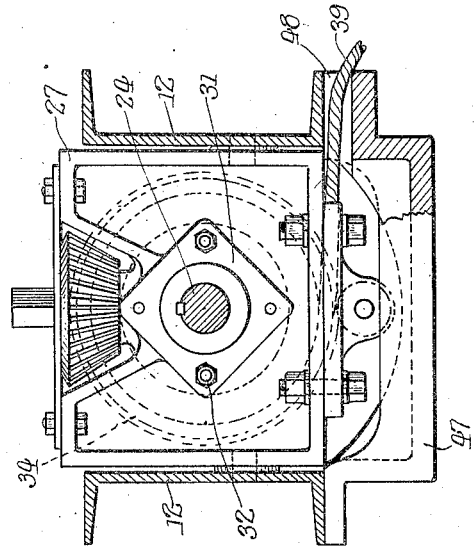
Inventor:
James Dunlop,
By Churchill Parker Coulson
                              Attys.

Patented Aug. 31, 1926.

1,598,065

UNITED STATES PATENT OFFICE.

JAMES DUNLOP, OF CHICAGO, ILLINOIS, ASSIGNOR TO KAESTNER & HECHT COMPANY, OF CHICAGO, ILLINOIS, A CORPORATION OF ILLINOIS.

SAFETY DEVICE FOR ELEVATORS.

Application filed August 16, 1924. Serial No. 732,400.

My invention relates to improvements in safety devices for elevators, and has particular reference to friction clamp devices adapted to engage the guide rails at the sides of the hatchway to brake the movement of the cage when its speed exceeds a predetermined value.

One of the objects of my invention is to provide a friction clamp safety device with a fine and precise adjustment, whereby the clamping members can be made to engage both rails with substantially equal effect.

Another object is to provide an adjustable friction clamp safety device in which the parts for effecting the fine adjustment are protected from dust, moisture, corrosion and other like injurious agents.

Further objects and advantages will become apparent as the description proceeds.

In the drawings, Figure 1 is a plan view partially in section of the device embodying the features of my invention.

Fig. 2 is a fragmentary side view of the winding drum mechanism taken partially in section along line 2—2 of Fig. 1.

Fig. 3 is a view taken in the plane of line 3—3 of Fig. 1, and showing one end of the winding drum mechanism.

In the exemplary embodiment of the invention, a main supporting frame 10 is mounted to extend substantially across the hatchway between the T-shaped guide rails 11. This frame is constructed of a pair of parallel spaced channels 12 placed back to back, and connected at both ends by top and bottom plates 13 and 14 respectively. A plurality of vertical straps 15 are bolted to the very ends of the channels 12, and are adapted to be connected to some part of the elevator cage to support the frame 10.

Mounted between the channels 12 at each end of the frame 10 is a pair of clamping jaws 16 adapted to frictionally engage opposite sides of the rail 11. Each pair of jaws is pivotally mounted on a vertical pin 17 supported by the top and bottom plates 13 and 14, and held in place by collars 18. The jaws 16 are provided with rearwardly extending arms 19 having forked ends, and in each forked end a cam roller 20 is rotatably mounted on a roller pin 21. The pins 21 of each set of rollers 20 are connected by a coiled spring 22 which tends to move the jaws 16 away from the rail 11.

Mounted between the rollers 20 of each set to move the jaws 16 positively into engagement with the rail 11 is a cam or wedge member 23 secured to the outer reduced end of a slidable screw shaft or rod 24. The screw shafts 24 are in alinement, are provided with right and left hand threads respectively, and extend into a winding drum mechanism 25 whereby they are adapted to be shifted longitudinally. To obtain an equal clamping action at both rails 11, the rollers 20 of one set of jaws 16 are adjustable along slots 26 in the forked ends of the arms 19, thereby shifting the rollers along the irregular surface of the wedge 23, and effecting a coarse relative adjustment.

The winding drum mechanism 25 comprises a bearing frame 27 mounted between the channels 12 substantially midway of their ends and secured thereto by bolts 28. The frame 27 is preferably rectangular in cross section, and is provided with end bearings 29 in which a right and left hand nut 30 is rotatably mounted. The screw shafts 24 are threaded into the opposite ends of the nut 30, and are held against rotation by a pair of shaft bearings 31 keyed thereto and secured to the outer ends of the bearings 29 by bolts 32, four for each bearing in the present instance. Mounted on the screw shafts 24 between the nut 30 and the bearings 31 and inside the bearings 29 are a pair of oil saturated felt washers 33. By this construction the threaded parts are completely enclosed and oiled, thereby protecting them from corrosion, dust, moisture and the like, and ensuring the efficient and positive operation of the device. The screw shafts 24 can be relatively adjusted to effect a fine adjustment of the relative clamping action of the two pairs of jaws 16 by removing one or the other of the bearings 31, rotating the shaft the desired amount, and then replacing the bearing. Since in the present instance each bearing 31 is held in place by four bolts, the smallest adjustment that can be effected is obtained by turning the screw shaft through one-fourth turn.

Mounted on the nut 30 for rotation therewith is a winding drum 34 having a closely spaced spiral groove 35 extending from one end to the other. To provide means for manually rotating the drum 34, the latter is formed integral with a bevel gear 36 at one end which meshes with a bevel gear 37 mounted to rotate with a square headed stud 38 in the frame 27. The drum is adapted to be automatically rotated when the speed of the car exceeds a predetermined value by a cable 39 wound in the groove 35 and extending laterally from the frame 27, and then about two sheaves 40 and 41 to any suitable speed governor (not shown). The sheave 40 is mounted in a lateral bracket 42 secured to one of the channels 12 by the bolts 28, and the sheave 41 is journaled in a vertical bracket 43 mounted on the lower side of one of the top plates 13 which is extended beyond the channel 12 for this purpose.

Secured to opposite ends of the lower side of the frame 27 by bolts 44 are two bearings 45 in which is journaled a roller 46 directly underlying the drum 34 and engaging the cable 39. An oil buffer plate 47 formed with a small lateral opening 48 through which the cable 39 passes out and underlying the drum and roller is attached to the lower legs of the channels 12.

While I have herein disclosed the preferred embodiment of my invention with considerable particularity for purposes of illustration, it is to be understood that various modifications and alternative constructions may be made without departing from the spirit and scope of the invention as expressed in the appended claims.

I claim as my invention:

1. A safety device for elevators comprising, in combination, a frame adapted to be supported by the cage of the elevator, a pair of friction jaws mounted in each end of said frame and positioned to frictionally engage the sides of the guide rails in the hatchway, each jaw having a rearwardly extending arm, rollers mounted in said arms, a wedge member positioned between each pair of rollers, right hand and left hand screw shafts supporting said wedge members and extending into opposite ends of a right hand and left hand nut, a frame having end bearings supporting said nut, said frame being mounted in said first mentioned frame, shaft bearings keyed to said screw shafts and rigidly secured in any one of a plurality of positions to said first mentioned bearings, fibre washers mounted on said screw shafts between the inner ends of said shaft bearings and the ends of said nut and inside said end bearings, and means for rotating said nut.

2. A safety device for elevators comprising, in combination, a frame adapted to be secured to the cage of the elevator, clamping means mounted in the opposite ends of said frame and adapted to frictionally engage the guide rails in the hatchway, slidable means for actuating said clamping means including right and left hand screw shafts, a frame mounted within said first mentioned frame and having a pair of spaced bearings, a right and left hand nut journalled in said bearings, said shafts extending into opposite ends of said nut, shaft bearings splined to said shafts and secured in any one of a plurality of positions to said first mentioned bearings, a winding drum secured to said nut, and means for rotating said drum to shift said screw shafts.

3. A safety device for elevators comprising, in combination, a frame adapted to be mounted on the elevator cage, a friction clamp mounted in each end of said frame and adapted to engage the adjacent guide rail, right hand and left hand screw shafts having wedge members for actuating said clamps, a winding drum mechanism for sliding said shafts longitudinally and simultaneously in opposite directions, means for coarsely adjusting the relative position of one of said wedge members and clamp, and means forming part of said winding drum mechanism for effecting a fine relative longitudinal adjustment of said shafts whereby an equal clamping action can be obtained.

4. A safety device for elevators comprising, in combination, a frame adapted to be secured to the elevator cage, a friction clamp device mounted in each end of said frame, spring means tending to render said devices ineffective, wedge means for actuating said friction clamps, a pair of screw shafts supporting said wedge means, a rotatable member having right hand and left hand screw threads at opposite ends respectively, said shafts extending into opposite ends of said rotatable member, means for supporting said rotatable member, means for effecting an independent adjustment of each shaft with said rotatable member, and means for rotating said rotatable member to shift said shafts simultaneously in opposite directions.

5. A safety device for elevators comprising, in combination, a frame, a clamp device mounted in each end of said frame, sliding means for actuating said clamp devices, a pair of alined right hand and left hand screw shafts supporting said means, a rotatable member having right hand and left hand screw connections with said shafts respectively, means for enclosing said screw connections, means for supporting said rotatable member, and means for holding said shafts against rotation, one of said last mentioned means being constructed to provide an independent rotary adjustment of its shafts with said rotatable member, and means for rotating said rotatable member.

6. A safety clamp device comprising, in combination, a frame, a clamping device mounted in each end of said frame, a wedge member positioned to actuate each clamping member, means for adjusting the operative connection of one of said wedge members with the associated clamping member, a pair of right hand and left hand screw shafts supporting said wedge members, a rotatable member having right hand and left hand screw connections with the adjacent ends of said shafts, a frame having bearings for supporting said rotatable member, a shaft bearing splined to one of said shafts and secured in one of a plurality of positions to one of said first mentioned bearings, said bearings and said rotatable member serving to enclose the screw threads on said shafts and said rotatable member, means for oiling the screw threads, and means for rotating said rotatable member.

7. A safety clamp device comprising, in combination, a frame, a clamping device mounted in each end of said frame, a wedge member positioned to actuate each clamping device, means for adjusting the operative connection of one of said wedge members with the associated clamping device, a pair of right hand and left hand screw shafts supporting said wedge members and extending in opposite directions, a rotatable member having right hand and left hand screw threads engaging said shafts, a frame having spaced bearings for supporting said rotatable member, a removable shaft bearing splined to one of said shafts and secured to one of said first mentioned bearings, said shaft bearing, frame and rotatable member serving to enclose the threaded parts, and means for rotating said rotatable member.

8. A safety device for elevators comprising, in combination, a frame, a pair of clamping devices mounted in opposite ends of said frame, wedge members for actuating said devices, a pair of alined shafts supporting said wedge members and mounted to move simultaneously in opposite directions, means for adjusting the operable connection between one of said wedge members and the associated clamping members, means for adjusting one of said shafts independently of the other, and means for moving said shafts longitudinally.

9. A safety device for elevators comprising, in combination, a frame, a pair of clamping jaws mounted in each end of said frame, said clamping jaws having rearwardly extending arms with rollers, wedge means for moving said rollers apart, means for adjusting the operable position of one set of said rollers with respect to the associated wedge member, a rotatable member, a pair of sliding rods supporting said wedge members, said rods having respectively right hand and left hand screw thread connections with said rotatable member, means for supporting said rotatable member and for holding said rods against rotation, said means allowing an independent adjustment of one of said shafts relative to the other, and means for rotating said rotatable members.

10. A safety device for elevators comprising, in combination, a frame, clamping jaws mounted in opposite ends of said frame, said clamping jaws having rearwardly extending arms with rollers, wedge means for moving said rollers apart, a rotatable member, a pair of sliding members supporting said wedge means and having respectively right hand and left hand screw thread connections with said rotatable member, means for supporting said rotatable member and for holding said sliding members against rotation, said means allowing an independent adjustment of one of said sliding members relative to the other, and means for rotating said rotatable member.

11. In a safety device for elevators, in combination, a frame having a bearing, an internally threaded nut journaled in one end of said bearing, a longitudinally slidable screw rod extending into the other end of said bearing and into said nut, a removable bearing splined to said rod, a plurality of equally spaced bolts securing said last mentioned bearing to said frame in any one of a plurality of angular positions, and a fibre member on said rod between said removable bearing and said nut.

12. In a safety device for elevators, in combination, a frame having a bearing, an internally threaded nut journaled in one end of said bearing, a longitudinally slidable screw rod extending into the other end of said bearing and into said nut, a removable bearing splined to said rod, and a plurality of equally spaced bolts securing said last mentioned bearing to said frame in any one of a plurality of angular positions.

13. In a safety device for elevators, in combination, a frame having a bearing, a rotatable member journaled in one end of said bearing, a threaded rod extending through said bearing into said member, means on said rod closing the other end of said bearing and holding said rod against rotation, and means for removably securing said last mentioned means to said frame, said last mentioned means when released from said frame allowing said rod and said first mentioned means to turn as a unit to adjust said rod relative to said member.

In testimony whereof, I have hereunto affixed my signature.

JAMES DUNLOP.